US012664320B2

(12) United States Patent
Colombo

(10) Patent No.: US 12,664,320 B2
(45) Date of Patent: Jun. 23, 2026

(54) PROCESSING SYSTEM, INTEGRATED CIRCUIT, DEVICE, AND METHOD FOR DATA TRANSFER FOR SECURE PROCESSING

(71) Applicant: STMicroelectronics International N.V., Geneva (CH)

(72) Inventor: Roberto Colombo, Munich (DE)

(73) Assignee: STMicroelectronics International N.V., Geneva (CH)

( * ) Notice: Subject to any disclaimer, the term of this patent is extended or adjusted under 35 U.S.C. 154(b) by 247 days.

(21) Appl. No.: 18/216,318

(22) Filed: Jun. 29, 2023

(65) Prior Publication Data

US 2025/0005204 A1      Jan. 2, 2025

(51) Int. Cl.
*G06F 21/72* (2013.01)
(52) U.S. Cl.
CPC ..................................... *G06F 21/72* (2013.01)
(58) Field of Classification Search
CPC ....... H04L 9/14; H04L 2209/12; G06F 21/72; G06F 21/71; G06F 21/602; G06F 9/30007; G06F 21/78
USPC .... 380/28–29, 37, 42, 44, 46, 255; 713/153, 713/174, 189, 192, 150, 190
See application file for complete search history.

(56) References Cited

U.S. PATENT DOCUMENTS 4,238,853 A * 12/1980 Ehrsam ................. H04L 9/0656
713/153
7,885,405 B1    2/2011 Bong
8,594,322 B2   11/2013 Bertoni et al.
(Continued)

FOREIGN PATENT DOCUMENTS

CN      105007154 B    7/2018
CN      112906070 A    6/2021
(Continued)

OTHER PUBLICATIONS

Katkade et al., "Application of AES algorithm for data security in serial communication," 2016 International Conference on Inventive Computation Technologies (ICICT), Coimbatore, India, 2016, pp. 1-5, doi: 10.1109/INVENTIVE.2016.7830170.
(Continued)

*Primary Examiner* — Lizbeth Torres-Diaz
(74) *Attorney, Agent, or Firm* — Alston & Bird LLP

(57) ABSTRACT

In accordance with various embodiments of the present disclosure, a processing system is provided. In some embodiments, the processing system comprises a non-secure processing unit and a cryptographic coprocessing unit. The cryptographic coprocessing unit comprises a data interface and a hardware cryptographic engine. The data interface is configured to receive, from the non-secure processing unit, one or more control blocks and one or more data block. The hardware cryptographic engine is configured to process, as a function of a cryptographic key, the one or more control blocks and the one or more data blocks received by the data interface. The data interface is configured to receive a first control block from the non-secure processing unit, latch the received first control block, receive a first data block from the non-secure processing unit and transfer the latched first control block and the received first data block to the hardware cryptographic engine.

17 Claims, 6 Drawing Sheets

(56) References Cited

U.S. PATENT DOCUMENTS

| | | | | |
|---|---|---|---|---|
| 9,215,067 | B2 * | 12/2015 | Glider | H04L 9/0816 |
| 9,325,498 | B2 | 4/2016 | Dixon et al. | |
| 10,110,426 | B2 * | 10/2018 | Wang | H04L 61/2592 |
| 11,032,067 | B2 | 6/2021 | Colombo et al. | |
| 11,057,194 | B2 | 7/2021 | Colombo et al. | |
| 11,615,716 | B2 * | 3/2023 | Ghosh | H04L 9/0631 |
| | | | | 380/28 |
| 2001/0042210 | A1 * | 11/2001 | Blaker | G06F 7/728 |
| | | | | 712/E9.067 |
| 2002/0191790 | A1 * | 12/2002 | Anand | H04L 9/0643 |
| | | | | 380/255 |
| 2004/0208318 | A1 | 10/2004 | Henry et al. | |
| 2004/0228481 | A1 * | 11/2004 | Crispin | G06F 9/3885 |
| | | | | 380/28 |
| 2011/0060915 | A1 * | 3/2011 | Tal | G06F 21/6218 |
| | | | | 711/E12.001 |
| 2011/0200189 | A1 | 8/2011 | True et al. | |
| 2019/0007201 | A1 * | 1/2019 | Colombo | H04L 9/14 |
| 2019/0007202 | A1 * | 1/2019 | Colombo | H04L 9/3239 |

FOREIGN PATENT DOCUMENTS

| | | | | | |
|---|---|---|---|---|---|
| CN | 115408313 | A | 11/2022 | | |
| JP | 200975474 | A | 4/2009 | | |
| WO | WO 2022/164381 | A1 | 8/2022 | | |
| WO | WO-2022269005 | A1 * | 12/2022 | | G06F 21/606 |

OTHER PUBLICATIONS

European Application No. 24181574, Extended European Search Report mailed Jul. 16, 2024.

* cited by examiner

PROCESSING SYSTEM, INTEGRATED CIRCUIT, DEVICE, AND METHOD FOR DATA TRANSFER FOR SECURE PROCESSING

FIELD OF THE INVENTION

Example embodiments of the present disclosure relate to secure data transfer and secure processing systems.

BACKGROUND

Applicant has identified many technical challenges and difficulties associated with secure processing of data, such as via cryptographic algorithms. Through applied effort, ingenuity, and innovation, Applicant has solved problems related to secure processing of data via cryptographic algorithms by developing solutions embodied in the present disclosure, which are described in detail below.

BRIEF SUMMARY

Various embodiments described herein relate to systems, integrated circuits, devices, and methods for data transfer for secure processing.

In accordance with various embodiments of the present disclosure, a processing system is provided. In some embodiments, the processing system comprises a non-secure processing unit and a cryptographic coprocessing unit. The cryptographic coprocessing unit comprises a data interface and a hardware cryptographic engine. The data interface is configured to receive, from the non-secure processing unit, one or more control blocks and one or more data block. The hardware cryptographic engine is configured to process, as a function of a cryptographic key, the one or more control blocks and the one or more data blocks received by the data interface. The data interface is configured to receive a first control block from the non-secure processing unit, latch the received first control block, receive a first data block from the non-secure processing unit and transfer the latched first control block and the received first data block to the hardware cryptographic engine.

In some embodiments, the data interface is configured to receive a second data block from the non-secure processing unit. If the second data block is received from the non-secure processing unit without a corresponding second control block, the data interface is configured to transfer the latched first control block and the received second data block to the hardware cryptographic engine.

In some embodiments, the data interface is configured to receive a second control block from the non-secure processing unit, latch the received second control block, receive a third data block from the non-secure processing unit, and transfer the latched second control block and the received third data block to the hardware cryptographic engine.

In some embodiments, the data interface is configured to receive a fourth data block from the non-secure processing unit. If the fourth data block is received from the non-secure processing unit without a corresponding third control block, the data interface is configured to transfer the latched second control block and the received fourth data block to the hardware cryptographic engine.

In some embodiments, the first control block contains a counter set value corresponding to a number of data blocks to be received by the data interface from the non-secure processing unit without a corresponding control block, the data interface is configured to set a countdown counter to the counter set value in the first control block, and the data interface is configured to decrement the countdown counter by one for each data block received from the non-secure processing unit without a corresponding control block.

In some embodiments, after each data block received by the data interface from the non-secure processing unit without a corresponding control block, the data interface is configured to check a current value of the countdown counter. If the current value of the countdown counter equals zero, the data interface is configured to expect to receive a control block with a next data block received from the non-secure processing unit.

In some embodiments, the hardware cryptographic engine is configured to support an Advanced Encryption Standard operation.

In some embodiments, each of the one or more control blocks contains eight bytes of data and each of the one or more data blocks contains sixteen bytes of data.

In accordance with various embodiments of the present disclosure, a processing system is provided. In some embodiments, the processing system comprises a non-secure processing unit and a cryptographic coprocessing unit. The cryptographic coprocessing unit comprises a data interface and a hardware cryptographic engine. The data interface is configured to receive, from the non-secure processing unit, a plurality of control blocks and a plurality of data blocks, at least some of the plurality of data blocks received subsequent to corresponding respective ones of the plurality of control blocks. The hardware cryptographic engine is configured to process, as a function of a cryptographic key, the plurality of control blocks and the plurality of data blocks received by the data interface. The data interface is configured to latch each control block as each control block is received, overwriting any previously latched control block. Each time a data block is received, the data interface is configured to transfer the latched control block and the received data block to the hardware cryptographic engine.

In accordance with various embodiments of the present disclosure, a method for receiving data to be cryptographically processed is provided. In some embodiments, the method comprises receiving, by a data interface of a cryptographic coprocessing unit from a non-secure processing unit, a first control block; latching, by the data interface from the non-secure processing unit, the received first control block; receiving, by the data interface from the non-secure processing unit, a first data block; and transferring, by the data interface to a hardware cryptographic engine of the cryptographic coprocessing unit, the latched first control block and the received first data block.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
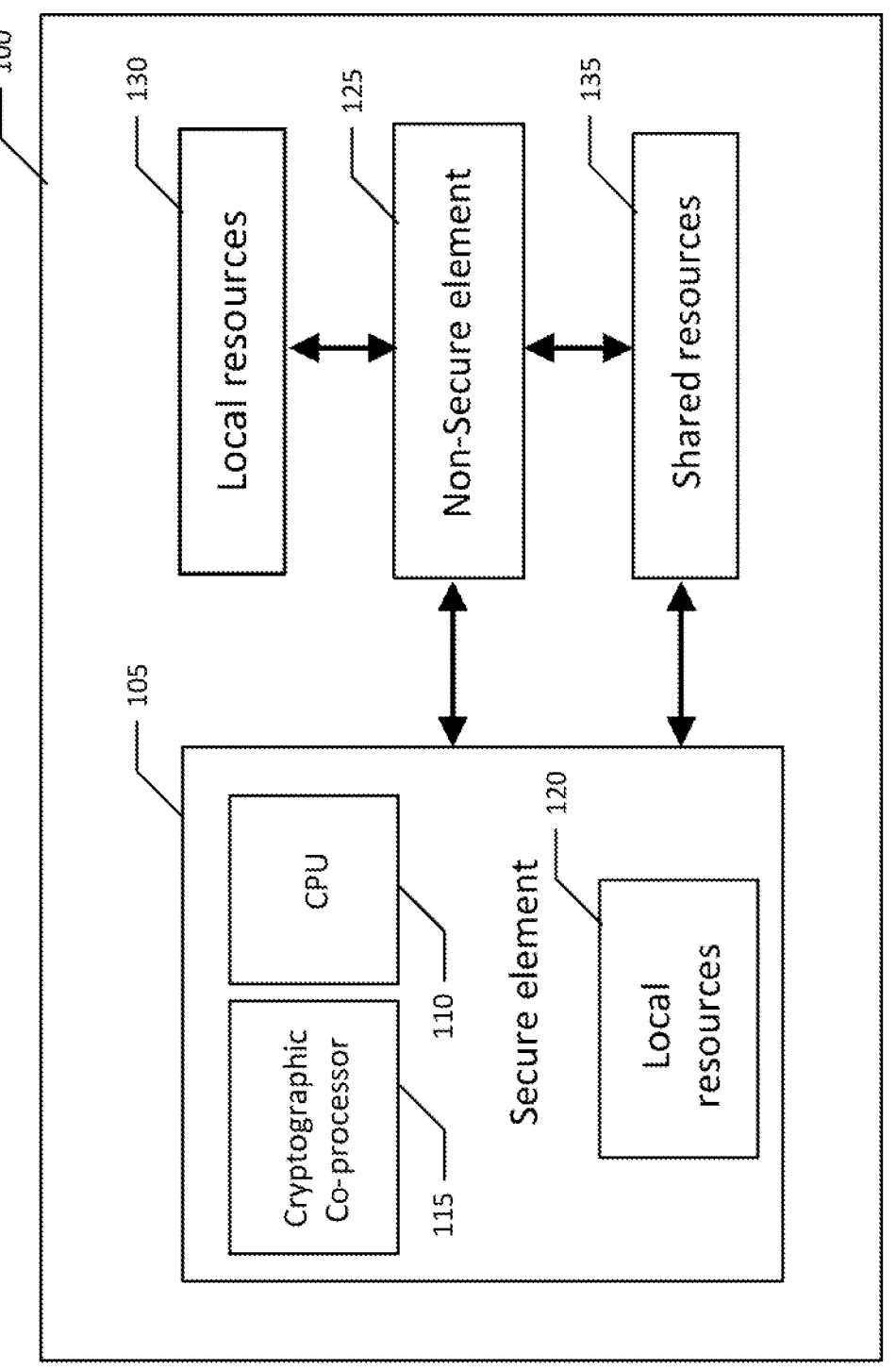
FIG. 1 illustrates a block diagram of an example system for data transfer, in accordance with an example embodiment of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly,"

"typically," "optionally," "for example," "often," or "might" (or other such language) be included or have a characteristic, that a specific component or feature is not required to be included or to have the characteristic. Such a component or feature may be optionally included in some embodiments, or it may be excluded.

The secure communication and/or processing of data, such as via cryptographic algorithms, is becoming widespread in many applications and systems. For example, security in automobiles is becoming increasingly important, especially since it has been demonstrated that a hacker can take control of a vehicle remotely. For this reason, communications between the various processing systems of a vehicle (at least those having a possible impact on data security) is often encrypted. While such encryption ensures secure communication and data processing, the use of encryption adds new challenges in terms of message processing latency and robustness (i.e., processing error handling). In some contexts, such processing systems are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

In response to these emerging and steadily increasing requests to have security features within the processing systems of a vehicle, one approach that has been used is the introduction of a secure programmable element, isolated from the rest of the micro-controller, and dedicated to handle and supervise secure tasks. Usually, this secure element is a dedicated and preferably programmable hardware component (e.g., within a field programmable gate array (FPGA), digital signal processor (DSP), microcontroller, and/or the like) and dedicated to handle and/or supervise security functions. With such an architecture, the isolated security element acts as a server for the rest of the processing system, exposing cryptographic service that is activated upon request While embodiments of the present disclosure will be described herein in terms of use for intra-vehicle data transfer, embodiments of the present disclosure may be used for data transfer in any suitable system and/or environment.

Referring now to FIG. 1, a block diagram of an example system for data transfer is illustrated in accordance with an example embodiment of the present disclosure. In some embodiments, the example system includes at least one processing system 100, such as a microprocessor, programmed via software instructions. In some embodiments, the processing system 100 includes a secure element 105 and a non-secure element 125. Embodiments of the invention involve data transfer between the secure element 105 and the non-secure element 125, and within the secure element 105, as described further below.

The secure element 105 is often referred to as a Hardware Security Module (HSM). In some embodiments, the secure element 105 includes a processing unit 110, such as an additional microprocessor programmed via software or a dedicated hardware module. In some embodiments, the secure element 105 further includes a cryptographic coprocessor 115. The cryptographic coprocessor 115 is the hardware engine dedicated to processing cryptographic services. In some embodiments, the cryptographic coprocessor 115 includes one or more digital encryption/cipher keys (unknown to the non-secure element 125) which may be used, e.g., to encrypt or decrypt data packets. In some embodiments, the secure element 105 is in an isolated environment in order to block access to the firmware (and thus the encryption keys) of the cryptographic coprocessor 115.

In some embodiments, the secure element 105 is configured to use the encryption key together with a symmetric encryption algorithm (e.g., Advanced Encryption Standard (AES)) or an asymmetric encryption algorithm, in order to, for example, encrypt or decrypt data, verify the identity of a sender, such as by decrypting a signature field, calculate a hashing function, and/or the like. Symmetric key cryptography is based on algorithms run by two entities using the same key, known by both the entities. The AES encryption algorithm is defined by the US National Institute of Standards and technology (NIST). The AES encryption algorithm defines an exact mathematical algorithm to be applied to 16 bytes of input data and transforming the input data into an output. The AES encryption algorithm uses a secret key as an input parameter of the algorithm. The AES encryption algorithm is not reversible. That is, given the output, even though the algorithm is known, it is impossible to derive the input without knowing the secret key. A variation of the AES encryption algorithm, termed "AES Light," is described in commonly owned U.S. Pat. No. 11,032,067, filed Jun. 28, 2018, and issued Jun. 8, 2021, and U.S. Pat. No. 11,057,194, filed Jun. 28, 2018, and issued Jul. 6, 2021, the contents of which are incorporated by reference herein in their entirety. While embodiments of the present disclosure will be described herein in terms of use with the AES Light encryption algorithm, embodiments of the present disclosure may be used with any suitable encryption algorithm.

This architecture creates a separation between the secure and the non-secure elements. The cryptographic service processing and the keys used for the cryptographic algorithm reside entirely within the secure domain.

In some embodiments, the processing system 100 includes one or more resources, such as: one or more memories, one or more communication interfaces, one or more analog-to-digital and/or digital-to-analog converters, one or more digital components, one or more analog components, and/or one or more mixed signal components. The one or more memories may include, for example but not limited to, a volatile memory and/or a non-volatile memory. The one or more communication interfaces may include, for example but not limited to, a universal asynchronous receiver/transmitter (UART), serial peripheral interface bus (SPI), inter-integrated circuit (I2C), controller area network (CAN) bus, and/or Ethernet. The one or more dedicated digital components may include, for example but not limited to, hardware timers and/or counters. The one or more analog components may include, for example but not limited to, comparators, sensors, such as a temperature sensor, etc. The one or more mixed signal components may include, for example but not limited to, a Pulse-Width Modulation (PWM) driver.

In some embodiments, each of these resources may be a local resource 130 accessible by (e.g. only by) the non-secure element 125, a shared resource 135 accessible by both the secure element 105 and the non-secure element 125, or a local resource 120 accessible by (e.g. only by) the secure element 105.

In some embodiments, the processing system 100 includes a communication channel between the secure element 105 and the non-secure element 125 (indicated by the arrow therebetween in FIG. 1). The communication channel is used to send cryptographic service requests to the secure element, such as encryption or decryption of data, which could come from the message communication between different engine control units. For example, an engine control unit detecting a dangerous situation might send a message to another engine control unit asking it to activate the braking system. To avoid attacks on this communication, the data exchanged may be encrypted.

One approach that has been used by the AES Light cryptographic algorithm is to transfer data to be processed by the AES Light cryptographic algorithm in 16 byte blocks (called an AES block or a data block). The data is processed by the AES Light cryptographic algorithm. According to the AES Light cryptographic algorithm, this type of data processing is called AES mode. Several modes within the AES algorithm are defined, for example: encryption, decryption, CMAC (Cipher-based message authentication codes) signature generation, CMAC signature validation, etc. The AES Light cryptographic algorithm can be operated either via software, in which a CPU transfers the data to/from an AES Light cryptographic engine (described further below), or in hardware, in which a direct memory access (DMA) moves the data to/from the AES Light cryptographic engine.

According to the AES Light cryptographic algorithm, the data to be processed can be just 16 bytes or a stream of 16 byte data blocks. According to the AES Light cryptographic algorithm, before starting the cryptographic processing it is necessary to setup the cryptographic engine by passing specified control information. According to the AES Light cryptographic algorithm, such control information may include what kind of AES processing shall be executed, which key shall be used, how the data is to be sent (in case the AES Light cryptographic engine has no embedded DMA and shall trigger an external DMA), etc. According to the AES Light cryptographic algorithm, this setup information is transferred via an 8 byte control block.

According to the AES Light cryptographic algorithm, after receiving the first control block, the AES Light cryptographic engine shall be started and, if the data is a long stream of AES blocks, the AES Light cryptographic engine will mostly execute the same operation until all the data is completely processed. According to the AES Light cryptographic algorithm, in addition to providing a control block with setup information for the AES Light cryptographic engine before the data is sent, a control block is sent before the last data block to instruct the AES Light cryptographic engine to stop the AES processing. According to the AES Light cryptographic algorithm, the control blocks and the data blocks are interleaved. That is, for every data block sent there is a control block sent immediately preceding each data block (8 byte control block, 16 byte data block, 8 byte control block, 16 byte data block, 8 byte control block, 16 byte data block, etc., until the last data block is sent). According to the AES Light cryptographic algorithm, the AES Light cryptographic engine expects to receive such interleaved control and data blocks.

However, as indicated above, if a long stream of AES blocks are being transferred, the AES Light cryptographic engine will mostly execute the same operation until all the data is completely processed. As such, in many contexts, only the first control block and the last control block contain relevant content, and the control blocks other than the first and last control blocks are duplicative.

Various embodiments of the present disclosure overcome the above technical challenges and difficulties and provide various technical improvements and advantages. Various embodiments of the present disclosure provide at least a mechanism to latch the control block value and reuse the latched control block value rather than transferring the control block before every data block.

Various embodiments of the present disclosure use an internal counter to indicate how many data blocks will be sent without a corresponding control block and therefore how many times the latched value of the control block will be reused before expecting a new control block.

Various embodiments of the present disclosure use a write control signal and the matching of the write transaction address with the address of the control register to trigger the latching of the control register and reuse the latched control block until a new control block has been latched again.

Various embodiments of the present disclosure enable an optional selection of either using an internal counter to indicate how many data blocks will be sent without a corresponding control block or using a write control signal and the matching of the write transaction address with the address of the control register to trigger the latching of the control register.

Various embodiments of the present disclosure enable innovative handling of the data processing, targeting a boost in data transfer performance. Various embodiments of the present disclosure enable a reduction in the amount of data transferred of almost one-third due to not transferring a control block with every data block.

The AES Light cryptographic algorithm specifies the bit field of the control block, that is, what each bit or combination of bits in the 8 byte control block indicates. For example, according to the AES Light cryptographic algorithm, some bits in the first control block specify which AES mode and which key is to be used. According to the current AES Light cryptographic algorithm, there are ten unused bits in the control block. Various embodiments of the present disclosure use some or all of these unused bits in the control block to implement one or more features of embodiments of the present disclosure.

Figure 2:
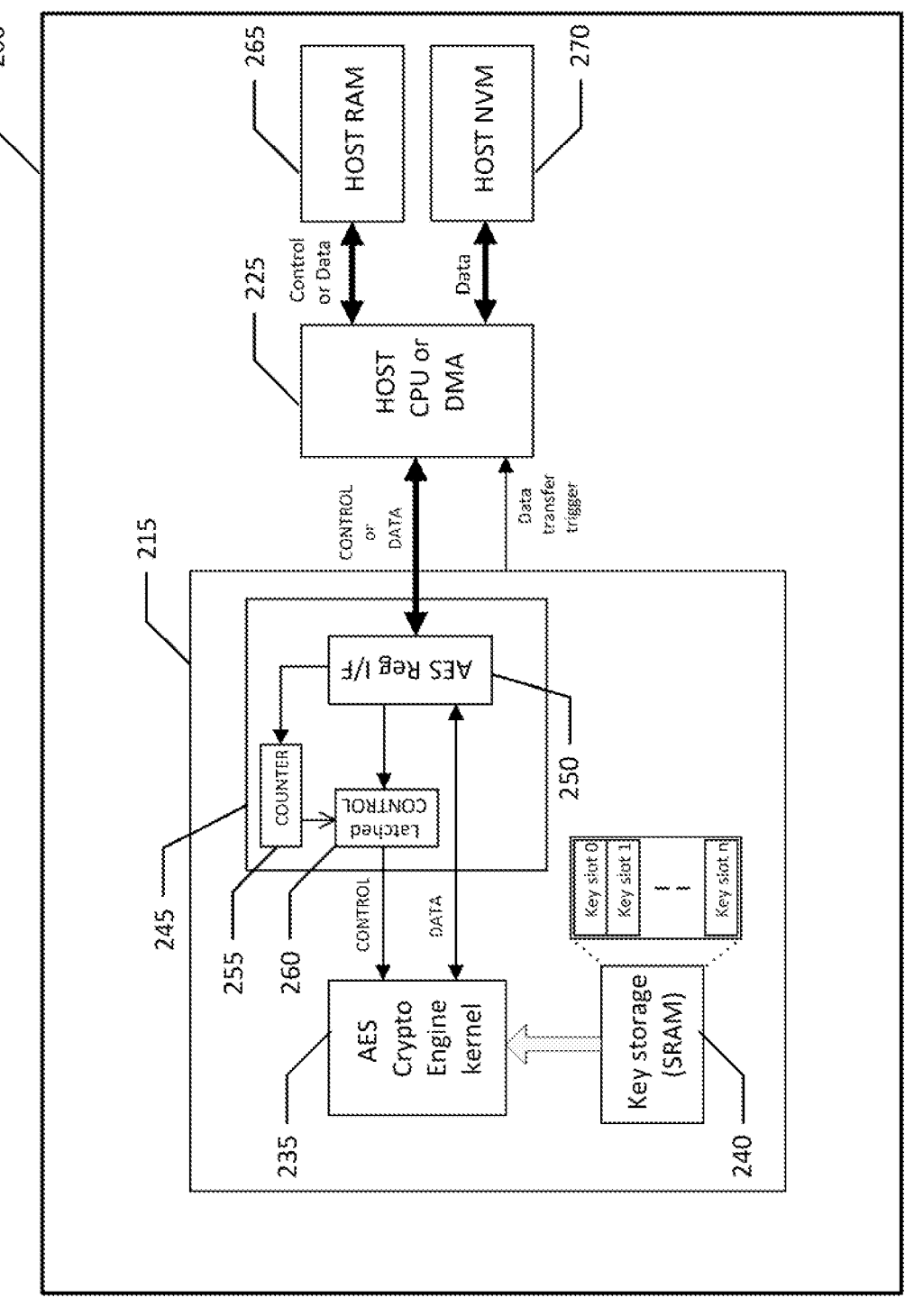
FIG. 2 illustrates a more detailed block diagram of a portion of an example system for data transfer, in accordance with an example embodiment of the present disclosure.

Referring now to FIG. 2, a more detailed block diagram of a portion of an example system for data transfer is illustrated in accordance with an example embodiment of the present disclosure. In some embodiments, the example system of FIG. 2 implements the use of an internal counter to indicate how many data blocks will be sent without a corresponding control block. FIG. 2 illustrates a processing system 200, such as a microprocessor, programmed via software instructions. In some embodiments, the processing system 200 includes a secure element and a non-secure element 225. In the illustrated example of FIG. 2, the secure element includes a cryptographic coprocessor 215 and omits the secure element CPU shown in FIG. 1 for simplicity. Embodiments of the invention involve data transfer between the cryptographic coprocessor 215 of the secure element and the non-secure element 225, and within the cryptographic coprocessor 215, as described further below. As illustrated, the non-secure element 225 may include a CPU which transfers the data to/from the cryptographic coprocessor 215 or a DMA which moves the data to/from the cryptographic coprocessor 215. If a DMA is used, a data transfer trigger is sent as indicated in FIG. 2. As illustrated, the non-secure element 225 may utilize local resources such as RAM 265 and/or non-volatile memory 270 for storing/accessing control information and/or data.

In some embodiments, the cryptographic coprocessor 215 includes an AES Light crypto engine kernel 235 which implements the AES Light cryptographic algorithm, such as by using one or more keys stored in a key storage memory 240. In some embodiments, the AES Light crypto engine kernel implements the AES Light algorithm into a kernel logic which is activated every time 16 data bytes shall be processed. In some embodiments, the way the input data are processed is dictated by the AES mode, for example, as an encryption, a decryption, or a signature calculation, etc. In some embodiments, whatever the chosen AES mode, the algorithm used to process the 16 data bytes is always the same. In some embodiments, the implementation of the crypto engine has additional hardware features, such as a register interface used to push in the data bytes and read out the result. In some embodiments, the implementation of the crypto engine has a means for informing the crypto engine what to do, for example, which AES mode, which secret key to use, etc. In some embodiments, this means for informing the crypto engine what to do is a control register, as described further below.

In some embodiments, the cryptographic coprocessor 215 includes a data handling circuitry 245. In some embodiments, the data handling circuitry 245 includes an AES register interface 250 which receives/sends control and data blocks from from/to the non-secure element 225 as indicated by the arrow therebetween in FIG. 2. In some embodiments, the data handling circuitry 245 further includes a counter 255 (e.g., a countdown counter) and a control block latch memory location 260 for latching the control block as described herein.

Figure 3:
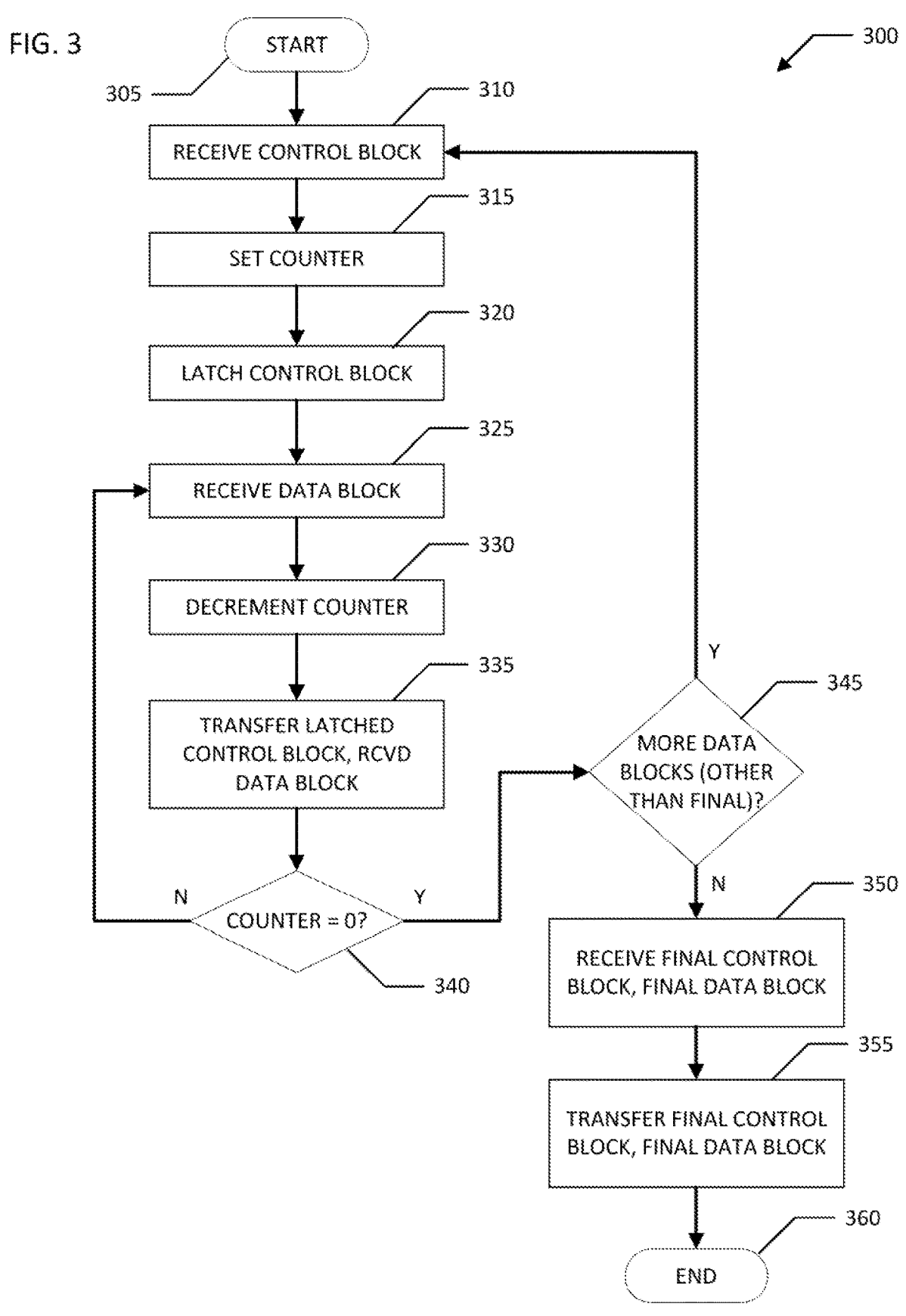
FIG. 3 is an example flow diagram illustrating an example method for transfer of data for secure processing, in accordance with an example embodiment of the present disclosure.

Referring now to FIG. 3, an example method 300 in accordance with some embodiments of the present disclosure is illustrated. In particular, the example method 300 illustrates example steps/operations of transferring data for secure processing, in accordance with some embodiments of the present disclosure. The example method of FIG. 3 describes transferring data from the non-secure element 225 to the cryptographic coprocessor 215, although embodiments of the invention can also be used for transferring data from the cryptographic coprocessor 215 to the non-secure element 225. The example method of FIG. 3 describes transferring data from a CPU as the non-secure element 225, rather than via DMA, although embodiments of the invention can also be used for transferring data via DMA.

The example method 300 of FIG. 3 starts at step/operation 305. At step/operation 310, a controller in a secure element (such as, but not limited to, the cryptographic coprocessor 215 of the system 200 described above in connection with FIG. 2, in conjunction with the AES register interface 250) receives a control block from a controller in a non-secure element (such as, but not limited to, the CPU of the non-secure element 225 of the system 200 described above in connection with FIG. 2). According to the AES Light cryptographic algorithm, this first control block includes setup information, such as for example, what kind of AES processing shall be executed, which key shall be used, how the data is to be sent, etc. In some embodiments, this first control block also contains a set value for a timer, such as a countdown timer. In some embodiments, the set value for the timer is equal to the number of data blocks that will be sent from the non-secure element without a corresponding control block. In some embodiments, the number of data blocks that will be sent without a corresponding control block is determined based on the number of data blocks that would conventionally have been sent with an identical control block. Thus, in some embodiments, the number of data blocks that will be sent without a corresponding control block equals the total number of data blocks minus the final data block (according to the AES Light cryptographic algorithm, the final data block is preceded by a final control block that indicates that the next data block is the final data block).

As described above, according to the current AES Light cryptographic algorithm there are ten unused bits in the control block. If all ten unused bits are used by embodiments of the disclosure for specifying a counter set value, then the maximum counter set value would be 1024 (i.e., 2^10). In some embodiments, some of the unused bits may be used for other features of embodiments of the disclosure, in which case the maximum counter set value would be less than 1024 (e.g., 512 if nine of the unused bits are used for specifying a counter set value (i.e., 2^9), or 256 if eight of the unused bits are used for specifying a counter set value (i.e., 2^8)).

In some embodiments, if the number of data blocks that will be sent without a corresponding control block is greater than the maximum counter set value possible based on the number of unused bits that are used by embodiments of the disclosure for specifying a counter set value, then the data blocks that will be sent without a corresponding control block can be split into two or more groups with a control block sent at the start of each group specifying the appropriate counter set value for that group. For example, if the maximum counter set value is 1024 and the number of data blocks that will be sent without a corresponding control block is 1500, the data blocks could be sent in two groups. In such an example, there may be one group of 1000 data blocks and one group of 500 data blocks, with a control block preceding each group that indicates the appropriate counter set value for that group.

At step/operation 315, a controller in a secure element (such as, but not limited to, the cryptographic coprocessor 215 of the system 200 described above in connection with FIG. 2, in conjunction with the AES register interface 250) sets a counter element (such as, but not limited to, the counter 255 of the system 200 described above in connection with FIG. 2) to the set value specified in the control block received at step/operation 310. In some embodiments, the counter is a countdown counter.

In some embodiments, if the counter bitfield is set to 0, this indicates that a control block will be sent with each data block. In some embodiments, this enables compatibility with the standard AES Light cryptographic algorithm.

At step/operation 320, a controller in a secure element (such as, but not limited to, the cryptographic coprocessor 215 of the system 200 described above in connection with FIG. 2, in conjunction with the AES register interface 250) latches or stores the control block received at step/operation 310 at a memory location (such as, but not limited to, the control block latch memory location 260 of the system 200 described above in connection with FIG. 2).

At step/operation 325, a controller in a secure element (such as, but not limited to, the cryptographic coprocessor 215 of the system 200 described above in connection with FIG. 2, in conjunction with the AES register interface 250) receives a data block from a controller in a non-secure element (such as, but not limited to, the CPU of the non-secure element 225 of the system 200 described above in connection with FIG. 2).

At step/operation 330, a controller in a secure element (such as, but not limited to, the cryptographic coprocessor 215 of the system 200 described above in connection with FIG. 2, in conjunction with the AES register interface 250) decrements the counter 255 in response to the data block received at step/operation 325.

At step/operation 335, a controller in a secure element (such as, but not limited to, the cryptographic coprocessor 215 of the system 200 described above in connection with FIG. 2, in conjunction with the AES register interface 250) transfers the latched control block and the data block received at step/operation 325 to a cryptographic engine (such as, but not limited to, the AES Light crypto engine kernel 235 of the system 200 described above in connection with FIG. 2) to be processed according to the AES Light cryptographic algorithm.

At step/operation 340, a controller in a secure element (such as, but not limited to, the cryptographic coprocessor 215 of the system 200 described above in connection with FIG. 2, in conjunction with the AES register interface 250) determines if the value of the counter 255 is zero. If it is determined at step/operation 340 that the value of the counter 255 is not zero, the method 300 returns to step/operation 325 at which point a controller in a secure element (such as, but not limited to, the cryptographic coprocessor 215 of the system 200 described above in connection with FIG. 2, in conjunction with the AES register interface 250) receives another data block from a controller in a non-secure element. In some embodiments, steps/operations 325 through 340 will continue until it is determined at step/operation 340 that the value of the counter 255 is zero.

If it is determined at step/operation 340 that the value of the counter 255 is zero, the method 300 proceeds to step/operation 345 at which point it is determined if there are more data blocks (other than the final data block) to be transferred. As described above, the number of data blocks that will be sent without a corresponding control block may be greater than the maximum counter set value possible based on the number of unused bits that are used by embodiments of the disclosure for specifying a counter set value. In such a case, the data blocks that will be sent without a corresponding control block can be split into two or more groups with a control block sent at the start of each group specifying the appropriate counter set value for that group. Step/operation 345 contemplates such a case in which there is a second (or third or fourth, etc.) group of data blocks that will be sent without a corresponding control block. If it is determined at step/operation 345 that there are more data blocks (other than the final data block) to be transferred, the method 300 returns to step/operation 310 in which a new control block with a new counter set value is received. In some embodiments, steps/operations 310 through 345 will continue until it is determined at step/operation 345 that there are no more data blocks (other than the final data block) to be transferred at which point the method 300 proceeds to step/operation 350.

At step/operation 350, a controller in a secure element (such as, but not limited to, the cryptographic coprocessor 215 of the system 200 described above in connection with FIG. 2, in conjunction with the AES register interface 250) receives the final control block and the final data block from a controller in a non-secure element (such as, but not limited to, the CPU of the non-secure element 225 of the system 200 described above in connection with FIG. 2).

At step/operation 355, a controller in a secure element (such as, but not limited to, the cryptographic coprocessor 215 of the system 200 described above in connection with FIG. 2, in conjunction with the AES register interface 250) transfers the final control block and the final data block received at step/operation 350 to the AES Light crypto engine kernel 235 to be processed according to the AES Light cryptographic algorithm. The example method 300 of FIG. 3 ends at step/operation 360.

Figure 4:
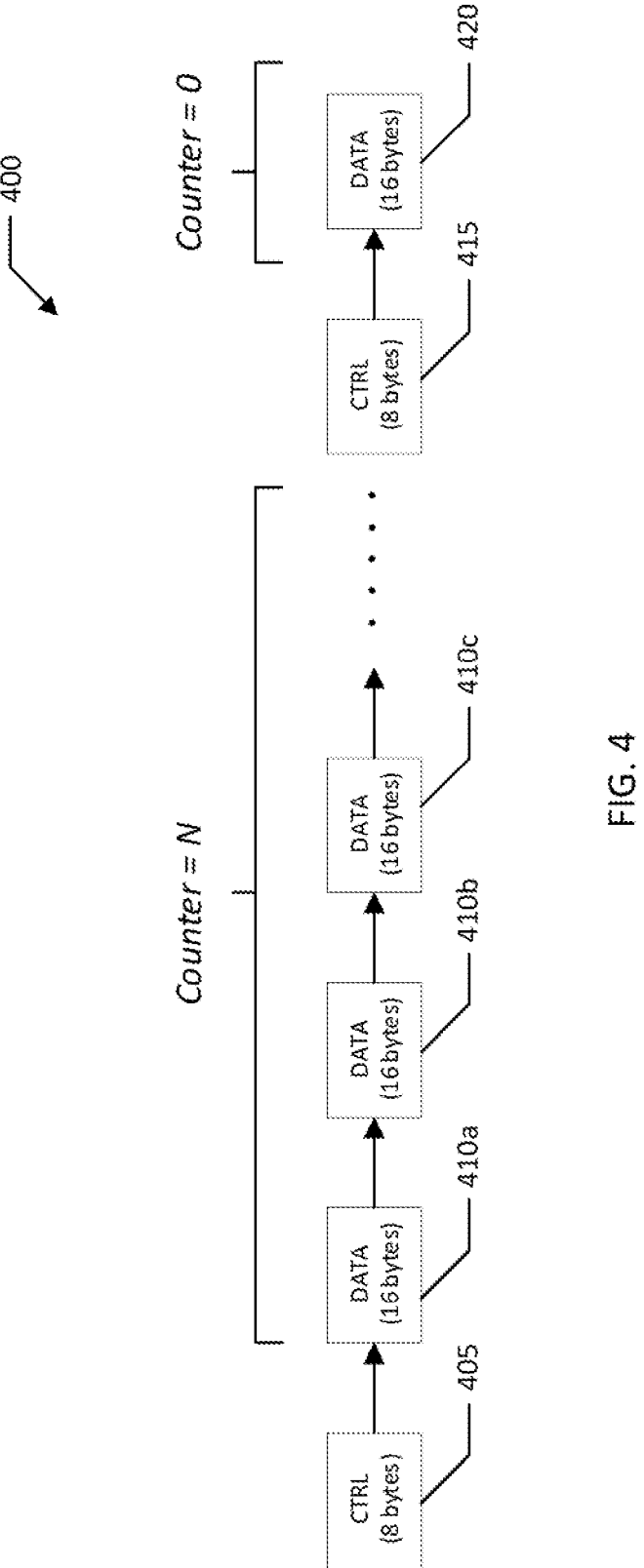
FIG. 4 illustrates an example data flow within the example system for data transfer of FIG. 2.

Referring now to FIG. 4, an example data flow such as might be seen in the example method 300 of FIG. 3 is illustrated. As seen in FIG. 4, the data flow 400 comprises an initial control block 405 that, as described above, contains setup information and a set value ("N") for a timer that is equal to the number of data blocks that will be sent without a corresponding control block. After the initial control block 405 is sent, a number of data blocks, 410*a*, 410*b*, 410*c*, etc. are sent, without interleaved control blocks. After "N" data blocks have been sent without corresponding preceding control blocks, the final control bock 415 is sent that indicates that the next data block is the final data block and then the final data block 420 is sent.

Figure 5:
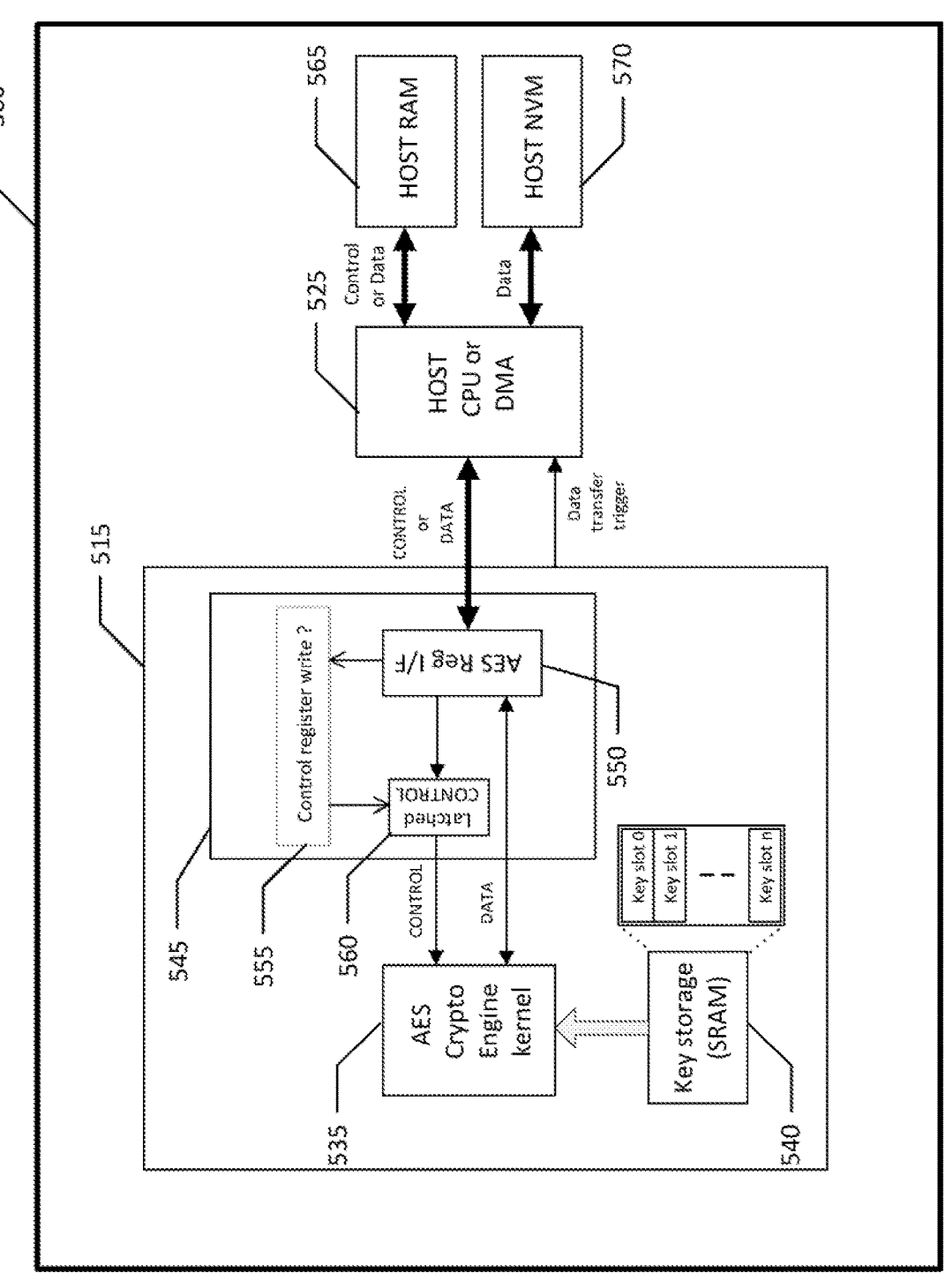
FIG. 5 illustrates a more detailed block diagram of a portion of an example system for data transfer, in accordance with an alternative example embodiment of the present disclosure.

Referring now to FIG. 5, a more detailed block diagram of a portion of an example system for data transfer is illustrated in accordance with an example embodiment of the present disclosure. In some embodiments, the example system of FIG. 5 implements the use of an internal write control signal to indicate that a new control block has been received, should be latched, and should be reused until another new control block is received. FIG. 5 illustrates a processing system 500, such as a microprocessor, programmed via software instructions. In some embodiments, the processing system 500 includes a secure element and a non-secure element 525. In the illustrated example of FIG. 5, the secure element includes a cryptographic coprocessor 515 and omits the secure element CPU shown in FIG. 1. Embodiments of the invention involve data transfer between the cryptographic coprocessor 515 of the secure element and the non-secure element 525, and within the cryptographic coprocessor 515, as described further below. As illustrated, the non-secure element 525 may include a CPU which transfers the data to/from the cryptographic coprocessor 515 or a DMA which moves the data to/from the cryptographic coprocessor 515. If a DMA is used, a data transfer trigger is sent as indicated in FIG. 5. As illustrated, the non-secure element 525 may utilize local resources such as RAM 565 and/or non-volatile memory 570 for storing/accessing control and/or data.

In some embodiments, the cryptographic coprocessor 515 includes an AES Light crypto engine kernel 535 which implements the AES Light cryptographic algorithm, such as by using one or more keys stored in a key storage memory 540.

In some embodiments, the cryptographic coprocessor 515 includes a data handling circuitry 545. In some embodiments, the data handling circuitry 545 includes an AES register interface 550 which receives/sends control and data blocks from from/to the non-secure element 525 as indicated by the arrow therebetween in FIG. 5. In some embodiments, the data handling circuitry 545 further includes a control register write signal 555 and a control block latch memory location 560 for latching the control block as described herein.

Figure 6:
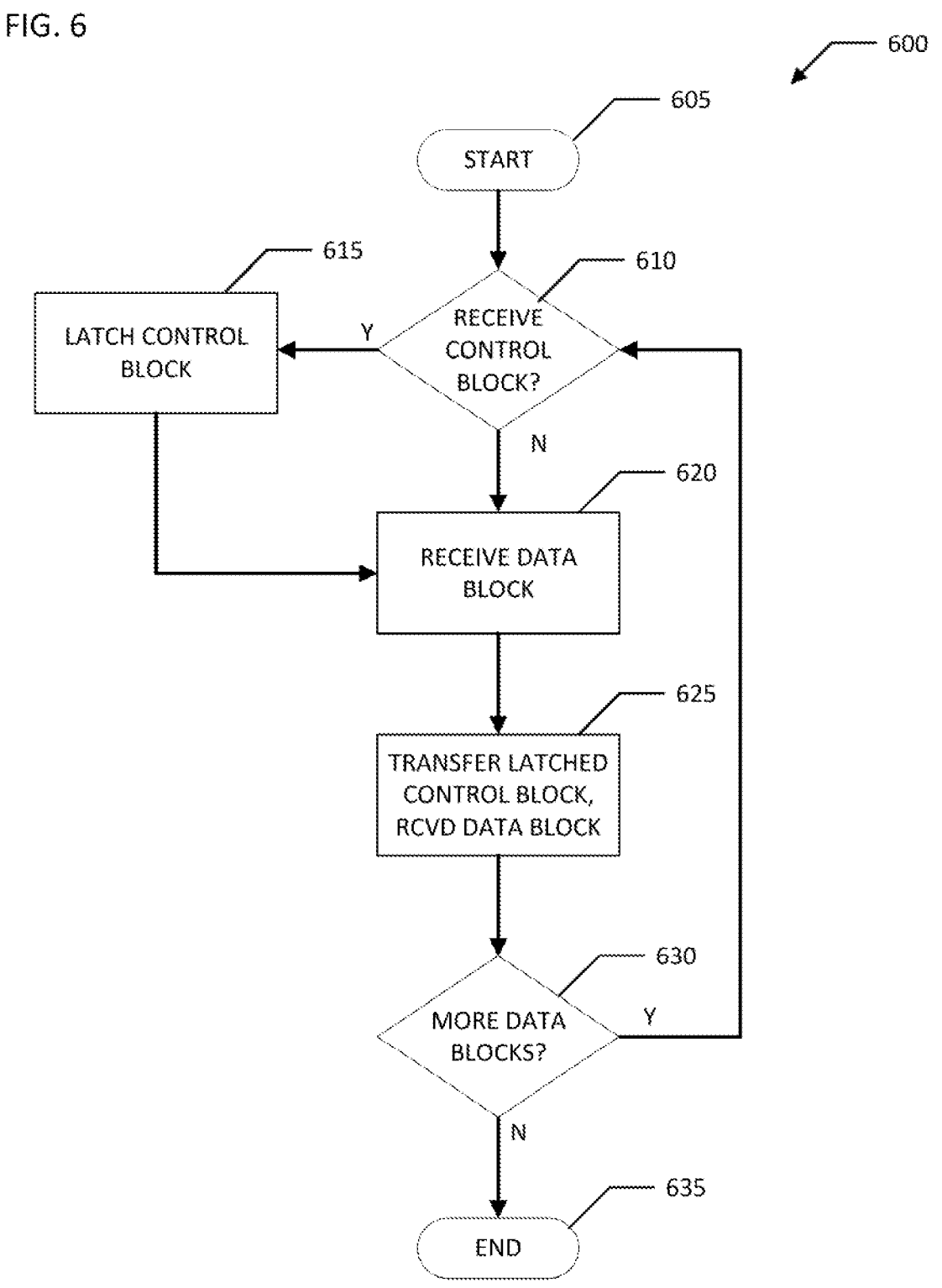
FIG. 6 is an example flow diagram illustrating an example method for transfer of data for secure processing, in accordance with an alternative example embodiment of the present disclosure.

Referring now to FIG. 6, an example method 600 in accordance with some embodiments of the present disclosure is illustrated. In particular, the example method 600 illustrates example steps/operations of transferring data for secure processing, in accordance with some embodiments of the present disclosure. The example method of FIG. 6 describes transferring data from the non-secure element 225 to the cryptographic coprocessor 215, although embodiments of the invention can also be used for transferring data from the cryptographic coprocessor 215 to the non-secure element 225. The example method of FIG. 6 describes transferring data from a CPU as the non-secure element 225, rather than via DMA, although embodiments of the invention can also be used for transferring data via DMA.

The example method 600 of FIG. 6 starts at step/operation 605. At step/operation 610, a controller in a secure element (such as, but not limited to, the cryptographic coprocessor 215 of the system 200 described above in connection with FIG. 2, in conjunction with the AES register interface 250)

determines if a control block has been received, such as by determining the status of a control register write signal 555.

If it is determined at step/operation 605 that a control block has been received, the method 600 proceeds to step/operation 610. At step/operation 615, a controller in a secure element (such as, but not limited to, the cryptographic coprocessor 215 of the system 200 described above in connection with FIG. 2, in conjunction with the AES register interface 250) latches or stores the received control block at a memory location (such as, but not limited to, the control block latch memory location 260 of the system 200 described above in connection with FIG. 2).

If it is determined at step/operation 610 that a control block has not been received (because it has been previously received), the method 600 proceeds to step/operation 620. At step/operation 620, a controller in a secure element (such as, but not limited to, the cryptographic coprocessor 215 of the system 200 described above in connection with FIG. 2, in conjunction with the AES register interface 250) receives a data block from a controller in a non-secure element (such as, but not limited to, the CPU of the non-secure element 225 of the system 200 described above in connection with FIG. 2).

At step/operation 625, a controller in a secure element (such as, but not limited to, the cryptographic coprocessor 215 of the system 200 described above in connection with FIG. 2, in conjunction with the AES register interface 250) transfers the latched control block and the data block received at step/operation 620 to a cryptographic engine (such as, but not limited to, the AES Light crypto engine kernel 235 of the system 200 described above in connection with FIG. 2) to be processed according to the AES Light cryptographic algorithm.

At step/operation 630 it is determined if there are more data blocks to be transferred. If it is determined at step/operation 630 that there are more data blocks to be transferred, the method 600 returns to step/operation 610. In some embodiments, steps/operations 610 through 630 will continue until it is determined at step/operation 630 that there are no more data blocks to be transferred at which point the method 600 proceeds to step/operation 635, at which point the example method 600 of FIG. 6 ends.

It is noted that each block of the flowchart, and combinations of blocks in the flowchart, may be implemented by various means such as hardware, firmware, circuitry and/or other devices associated with execution of software including one or more programming instructions. For example, one or more of the methods described in FIGS. 3 and 6 may be embodied by programming instructions, which may be stored by a non-transitory memory component of an apparatus employing an embodiment of the present disclosure and executed by one or more processing components in the apparatus. These programming instructions may direct the processing components or other programmable apparatus to function in a particular manner, such that the instructions stored in the non-transitory memory component produce an article of manufacture, the execution of which implements the function specified in the flowchart block(s).

As described above and as will be appreciated based on this disclosure, embodiments of the present disclosure may be configured as methods, devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

The example systems 100, 200, 500 may be implemented as part of an integrated circuit (IC) to perform, for example, one or more functions of a vehicle, such as but not limited to engine control, transmission control, anti-lock braking, and/or the like The microprocessor 100, 200, 500 may include one or more processors, input/output circuitry, data storage media, communications circuitry, and/or other components configured to perform compute operations. In some embodiments, the data storage media may be configured to store information, data, content, applications, instructions, or the like, for enabling the microprocessor 100, 200, 500 to carry out various functions. As such, in some embodiments, the microprocessor 100, 200, 500 may be referred to as functional logic. The microprocessor 100, 200, 500 may be embodied in a number of different ways, for example, in some embodiments, the microprocessor 100, 200, 500 may include one or more processing devices configured to perform independently. Additionally or alternatively, in some embodiments, the microprocessor 100, 200, 500 may include one or more processor(s) configured in tandem via a bus to enable independent execution of instructions, pipelining, and/or multithreading. The use of the terms "controller," "processor," and "processing circuitry" should be understood to include a single core processor, a multi-core processor, multiple processors internal to the microprocessor 100, 200, 500, and/or one or more remote or "cloud" processor(s) external to the microprocessor 100, 200, 500.

In an example embodiment, the microprocessor 100, 200, 500 may be configured to execute instructions stored in the data storage media or otherwise accessible to the processor. Alternatively or additionally, the microprocessor 100, 200, 500 in some embodiments is configured to execute hard-coded functionality. As such, whether configured by hardware or software methods, or by a combination thereof, the microprocessor 100, 200, 500 represents an entity (e.g., physically embodied in circuitry) capable of performing operations according to an embodiment of the present disclosure while configured accordingly. Alternatively or additionally, as another example in some example embodiments, when the microprocessor 100, 200, 500 is embodied as an executor of software instructions, the instructions specifically configure the microprocessor 100, 200, 500 to perform the algorithms embodied in the specific operations described herein when such instructions are executed.

Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

The use of the term "circuitry" as used herein with respect to components of the apparatus should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like While the example block diagrams of FIGS. 1, 2, and 5 illustrate, respectively, example systems 100, 200, and 500 for data transfer for secure processing, it is noted that the scope of the present disclosure is not limited to the example systems shown in FIGS. 1, 2, and 5. In some embodiments, example systems for data transfer for secure processing may comprise one or more additional or alternative components.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

While this detailed description has set forth some embodiments of the present disclosure, the appended claims cover other embodiments of the present disclosure which differ from the described embodiments according to various modifications and improvements. For example, the appended claims can cover any form of integrated circuit which provides secure data transfer, such as within a vehicle and such as but not limited to an Engine Control Unit (ECU), a Transmission Control Unit (TCU), an Anti-lock Braking System (ABS), a body control modules (BCM), and/or a navigation and/or multimedia audio system.

Within the appended claims, unless the specific term "means for" or "step for" is used within a given claim, it is not intended that the claim be interpreted under 35 U.S.C. 112, paragraph 6.

What is claimed is:

1. A processing system comprising:

a non-secure processing unit; and a cryptographic coprocessing unit comprising:

a data interface configured to receive, from the non-secure processing unit, one or more control blocks and one or more data blocks; and a hardware cryptographic engine configured to process, as a function of a cryptographic key, the one or more control blocks and the one or more data blocks received by the data interface;

wherein the data interface is configured to receive a first control block from the non-secure processing unit;

wherein the data interface is configured to latch the received first control block;

wherein the data interface is configured to receive a first data block from the non-secure processing unit; and wherein the data interface is configured to transfer the latched first control block and the received first data block to the hardware cryptographic engine;

wherein the first control block contains a counter set value corresponding to a number of data blocks to be received by the data interface from the non-secure processing unit without a corresponding control block;

wherein the data interface is configured to set a countdown counter to the counter set value in the first control block; and wherein the data interface is configured to decrement the countdown counter by one for each data block received from the non-secure processing unit without a corresponding control block.

2. The processing system of claim 1, wherein the data interface is configured to receive a second data block from the non-secure processing unit; and wherein, if the second data block is received from the non-secure processing unit without a corresponding second control block, the data interface is configured to transfer the latched first control block and the received second data block to the hardware cryptographic engine.

3. The processing system of claim 2, wherein the data interface is configured to receive a second control block from the non-secure processing unit;

wherein the data interface is configured to latch the received second control block;

wherein the data interface is configured to receive a third data block from the non-secure processing unit; and wherein the data interface is configured to transfer the latched second control block and the received third data block to the hardware cryptographic engine.

4. The processing system of claim 3, wherein the data interface is configured to receive a fourth data block from the non-secure processing unit; and wherein, if the fourth data block is received from the non-secure processing unit without a corresponding third control block, the data interface is configured to transfer the latched second control block and the received fourth data block to the hardware cryptographic engine.

5. The processing system of claim 1, wherein, after each data block received by the data interface from the non-secure processing unit without a corresponding control block, the data interface is configured to check a current value of the countdown counter; and wherein, if the current value of the countdown counter equals zero, the data interface is configured to expect to receive a control block with a next data block received from the non-secure processing unit.

6. The processing system of claim 1, wherein the hardware cryptographic engine is configured to support an Advanced Encryption Standard operation.

7. The processing system of claim 1, wherein each of the one or more control blocks contains eight bytes of data and each of the one or more data blocks contains sixteen bytes of data.

8. A processing system comprising:

a non-secure processing unit; and a cryptographic coprocessing unit comprising:

a data interface configured to receive, from the non-secure processing unit, a plurality of control blocks and a plurality of data blocks, at least some of the plurality of data blocks received subsequent to corresponding respective ones of the plurality of control blocks; and a hardware cryptographic engine configured to process, as a function of a cryptographic key, the plurality of control blocks and the plurality of data blocks received by the data interface;

wherein the data interface is configured to latch each control block as each control block is received, over-writing any previously latched control block; and wherein, each time a data block is received, the data interface is configured to transfer the latched control block and the received data block to the hardware cryptographic engine;

wherein at least a first one of the plurality of control blocks contains a counter set value corresponding to a number of data blocks to be received by the data interface from the non-secure processing unit without a corresponding control block;

wherein the data interface is configured to set a countdown counter to the counter set value in the first one of the plurality of control blocks; and wherein the data interface is configured to decrement the countdown counter by one for each data block received from the non-secure processing unit without a corresponding control block.

9. The processing system of claim 8, wherein, after each data block received by the data interface from the non-secure processing unit without a corresponding control block, the data interface is configured to check a current value of the countdown counter; and wherein, if the current value of the countdown counter equals zero, the data interface is configured to expect to receive a control block with a next data block received from the non-secure processing unit.

10. The processing system of claim 8, wherein the hardware cryptographic engine is configured to support an Advanced Encryption Standard operation.

11. The processing system of claim 8, wherein each of the plurality of control blocks contains eight bytes of data and each of the plurality of data blocks contains sixteen bytes of data.

12. A method for receiving data to be cryptographically processed, the method comprising:

receiving, by a data interface of a cryptographic coprocessing unit from a non-secure processing unit, a first control block;

latching, by the data interface from the non-secure processing unit, the received first control block;

receiving, by the data interface from the non-secure processing unit, a first data block, the first control block containing a counter set value corresponding to a number of data blocks to be received by the data interface from the non-secure processing unit without a corresponding control block;

transferring, by the data interface to a hardware cryptographic engine of the cryptographic coprocessing unit, the latched first control block and the received first data block;

setting, by the data interface of the cryptographic coprocessing unit, a countdown counter to the counter set value in the first control block; and decrementing, by the data interface of the cryptographic coprocessing unit, the countdown counter by one for each data block received from the non-secure processing unit without a corresponding control block.

13. The method of claim 12, further comprising:

receiving, by the data interface from the non-secure processing unit, a second data block; and if the second data block is received from the non-secure processing unit without a corresponding second control block, transferring, by the data interface to the hardware cryptographic engine of the cryptographic coprocessing unit, the latched first control block and the received second data block.

14. The method of claim 12, further comprising:

after each data block without a corresponding control block is received by the data interface from the non-secure processing unit, checking, by the data interface, a current value of the countdown counter;

wherein, if the current value of the countdown counter equals zero, the data interface is configured to expect to receive a control block with a next data block received from the non-secure processing unit.

15. The method of claim 12, further comprising:

receiving, by the data interface from the non-secure processing unit, a second control block;

latching, by the data interface of the cryptographic coprocessing unit, the received second control block;

receiving, by the data interface from the non-secure processing unit, a third data block from the non-secure processing unit; and transferring, by the data interface to the hardware cryptographic engine, the latched second control block and the received third data block.

16. The method of claim 15, further comprising:

receiving, by the data interface from the non-secure processing unit, a fourth data block; and if the fourth data block is received from the non-secure processing unit without a corresponding third control block, transferring, by the data interface to the hardware cryptographic engine, the latched second control block and the received fourth data block.

17. The method of claim 12, wherein the hardware cryptographic engine is configured to support an Advanced Encryption Standard operation.

* * * * *